UNITED STATES PATENT OFFICE.

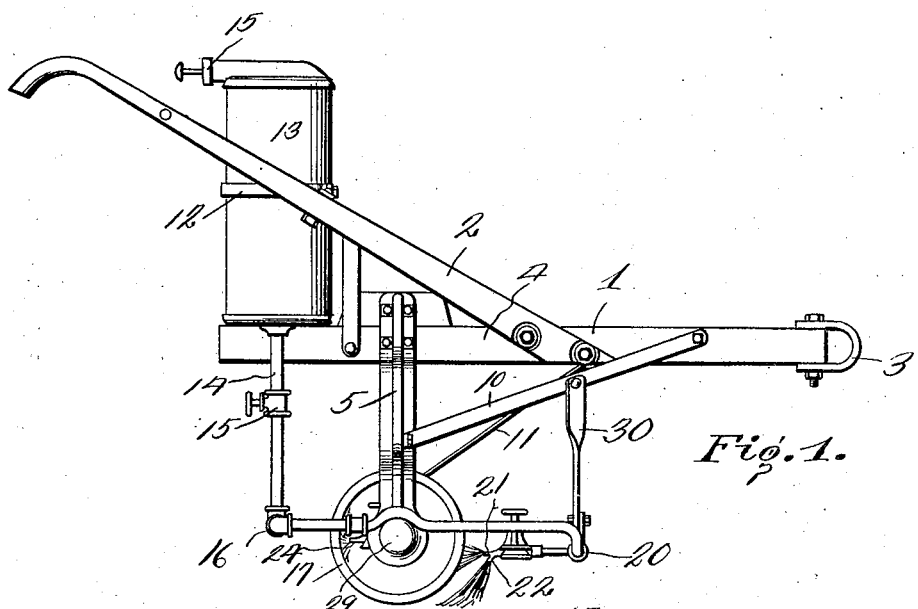
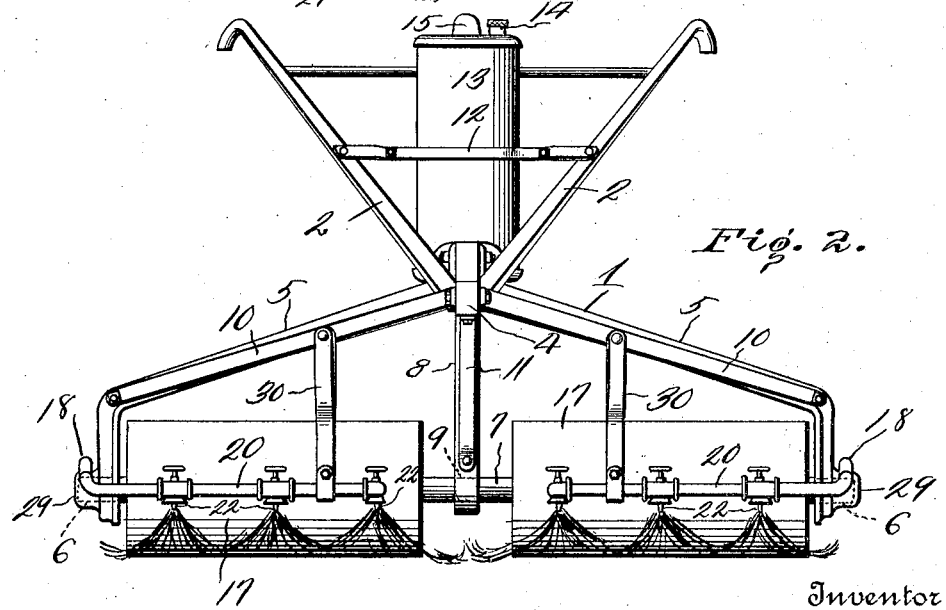

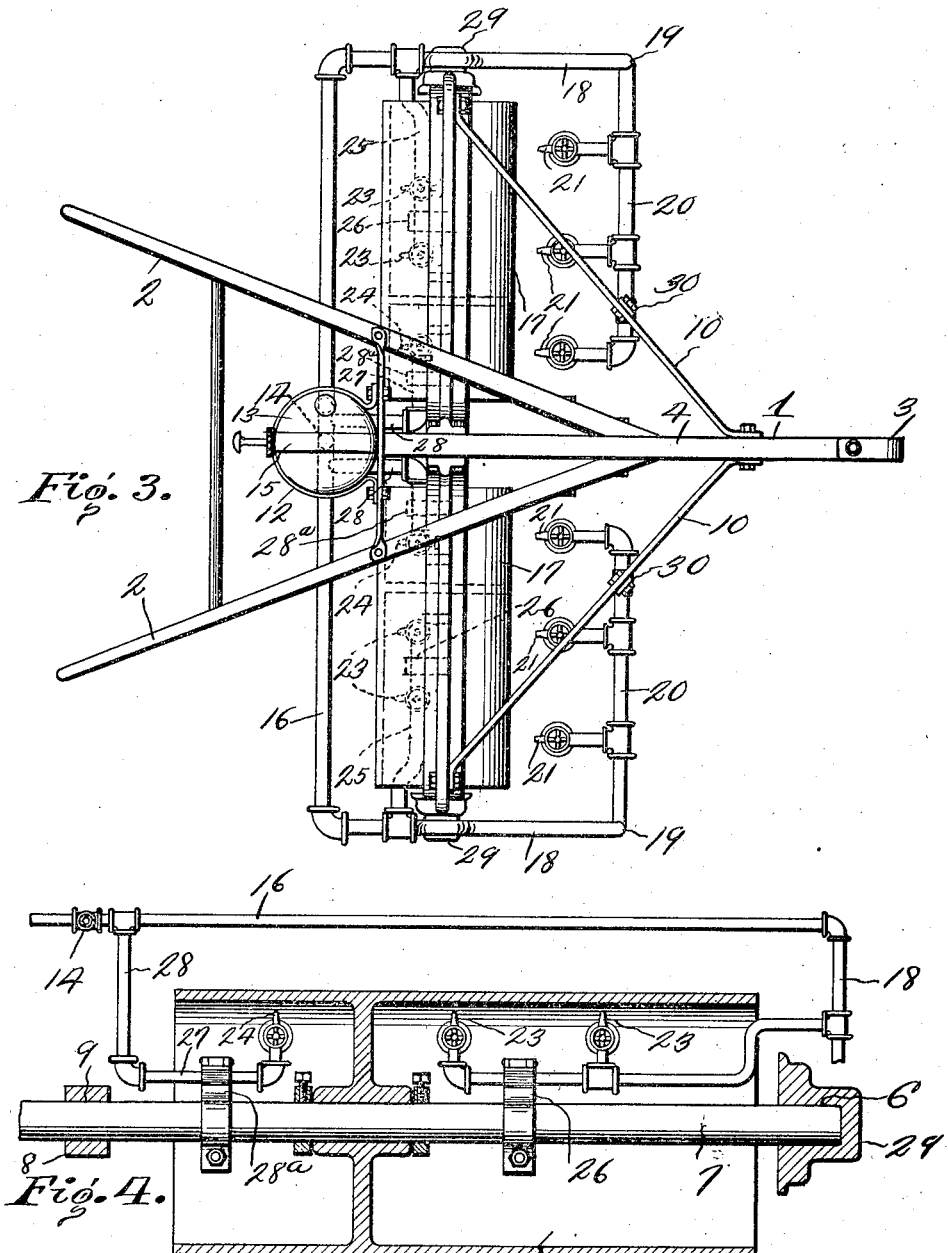

DANIEL DARLEY SMITH, OF VALDOSTA, GEORGIA.

INSECT-DESTROYER.

1,351,407.   Specification of Letters Patent.   Patented Aug. 31, 1920.

Application filed December 16, 1919. Serial No. 345,270.

*To all whom it may concern:*

Be it known that I, DANIEL D. SMITH, a citizen of the United States, residing at Valdosta, in the county of Lowndes, State of Georgia, have invented a new and useful Insect-Destroyer; and I do hereby declare the following to be a full, clear, and exact description of the invention, such as will enable others skilled in the art to which it appertains to make and use the same.

The invention relates to insect destroyers and has for its object to provide an insect destroyer particularly adapted for destroying and exterminating insects, said insects being of the character prevalent in the cotton fields and various crops, particularly boll weevil. It has been found that in growing cotton crops the young cotton becomes stung by the insect or weevil and when the particles of the buds of the plant fall on the ground, the eggs hatch a grub or small worm, which in time becomes converted into a weevil. Therefore it is a further object of the invention to provide an insect destroyer comprising rotatable rollers adapted to be moved over the ground and to provide means whereby an intense heat will be imparted to the rollers exteriorly and interiorly thereby allowing the rollers in their heated condition as they pass over the ground to burn and kill the eggs, which have fallen on the ground between the rows of plants.

A further object is to provide a system of burners particularly adapted for heating the rollers interiorly and exteriorly and to provide flame projectors so that flame will be projected against the ground in front of the rollers thereby additionally insuring the burning and killing of the eggs before the rollers pass over the eggs, grubs or weevils. The burner being particularly adapted for use in connection with the insect destroyer Patent No. 1,302,095, issued to me April 29, 1919.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the weevil destroyer.

Fig. 2 is a front elevation of the weevil destroyer.

Fig. 3 is a top plan view of the weevil destroyer.

Fig. 4 is a sectional view through one of the rollers showing the arrangement of the burners within the rollers.

Referring to the drawings, the numeral 1 designates a frame having rearwardly extending handles 2, there being a shackle 3 to the forward end of the frame to which draft animals may be attached. Extending outwardly and downwardly from the central beam 4 of the frame are brackets 5, said brackets being provided with bearings 6 in which the ends of a transversely disposed shaft 7 are rotatably mounted. Extending downwardly from the beam 4 is an arm 8, in a bearing 9 of which arm the shaft 7 is also rotatably mounted. Arm 8 not only provides means for supporting the shaft centrally but also prevents the flexing or bending of the shaft 7 as the machine as a whole is moved over the ground. Brackets 5 and arms 8 are braced by means of braces 10 and 11. Supported in a bracket 12 which is carried by the handles 2 is a conventional form of gasolene tank 13, said tank having a filling opening 14, and the tank is preferably provided with a conventional form of pump 15 whereby the gasolene within the tank 13 may be forced out under pressure thereby projecting the flame so as to obtain an intense heat. Extending downwardly from the bottom of the pressure tank 13 is a pipe 14 through which gasolene is forced, however, the flow of gasolene through the pipe being under control of the valve 15. The lower end of the pipe 14 terminates in a transversely disposed pipe 16 which is parallel to the rollers 17. Extending forwardly and connected to the outer ends of the pipe 16 are pipes 18, said pipes being adjacent the outer ends of the rollers 17, said pipes 18 being in turn bent inwardly as at 19 so as to provide pipe sections 20, parallel to the front sides of the rollers 17. The pipe sections 20 are provided with valve controlled burners 21 and 22, the burners 22 being so positioned so that they will project the flame downwardly into contact with the ground in front of the rollers so as to kill the insects or insect eggs that have fallen to the ground from the plants. Burners 21 project a flame against the outer periphery of the rollers thereby heating the rollers so that as the rollers advance they will kill the eggs and insects that may pass the flames from the burners 22. Rollers 17 are also utilized for crushing and killing the insects at the same time that the same are being burned by the rollers. It has been found that to properly maintain the rollers at a maximum heat and to get the very best results that it is necessary to provide burners 23 and 24 located within the rollers and so positioned that they will project flame against the inner periphery of the rollers at a point diametrically opposite to the point of contact of the flames and the burners 21. Burners 23 are carried on pipes 25 which pipes are connected to the pipes 18 adjacent the outer ends of the rollers 17. Pipes 25 being supported within the rollers 17 by means of brackets 26 which may be loosely mounted on the shaft 7, that is where its shaft is allowed to rotate, however if the shaft is fixed against rotation brackets 26 may be securely clamped to the shaft 7. In the structure shown shaft 7 has been shown so that it can rotate and also the rollers 17 have been shown so that they will rotate. The burners 23 and 24 are of conventional form and are preferably of the type which are valve controlled. Burners 24 are carried by pipes 27 which extend into the chambers of the rollers 17 at their adjacent inner ends, said pipes 27 being supported by means of brackets 28ª, which brackets are similar to the brackets 26. Pipes 27 are provided with right angle portions 28 which extend rearwardly and are connected to the pipe 16 at each side of the vertically disposed pipe 14 which leads from the pressure tank 13, pipe sections 18 are supported by the enlargements 29 of the brackets 5. Pipe sections 20 are supported by brackets 30 which have their upper ends connected to the braces 10 and their lower ends connected to the pipes 20.

It will be seen that the gasolene or fuel within the tank 13 will pass through the pipe 14 according to the adjustment of the valve 15. The gasolene will pass through the transversely disposed pipe 16, pipes 18, 20, 25, 28 and 27 to the burners within the rollers and the burners 21 and 22 disposed forwardly of the rollers. The intensity of the flame from the burners being controlled by the single valve 15, however, the burners within and without the rollers are of a conventional form whereby they may be controlled and regulated adjacent the burners. It will also be seen that as the machine moves forwardly that the insects and eggs that may have fallen from the plants will be burned and that those which escape the burning operation will be rolled by the hot rollers 17 and killed.

The invention having been set forth what is claimed as new and useful is:—

1. In an insect destroyer, the combination with a frame, of a pair of rollers in axial alinement with each other and rotatably mounted, said rollers being adapted to be moved over the ground between the rows of plants, a series of burners located within and without the rollers, said burners within the rollers projecting a flame against the inner periphery of the rollers at points diametrically opposite to the point of contact of the flame with the rollers located outside of the rollers and means for supplying fuel to the burners.

2. An insect destroyer comprising a frame, rollers transversely disposed and rotatably mounted in the frame, a series of burners located within the rollers, a series of burners located forwardly of the rollers, said burners within the rollers and without the rollers projecting flame against the inner and outer peripheries of the rollers, and means whereby fuel will be conveyed to the burners within and without the rollers from a common point of supply.

3. An insect destroyer comprising a frame, said frame being provided with rotatable rollers adapted to move over the ground between rows of plants, burners located within the rollers for heating said rollers, burners located forwardly of the rollers for additionally heating the rollers, said forwardly located burners also projecting flame against the ground in advance of the rollers, and means for supplying fuel to the burners.

4. An insect destroyer comprising a frame, said frame being provided with rotatable rollers adapted to move over the ground between rows of plants, burners located within the rollers for heating the same, burners located forwardly of the rollers for additionally heating the rollers as they are located, means for projecting a flame against the ground in advance of the rollers, and means for supplying fuel to the burners.

5. An insect destroyer comprising a frame, said frame being provided with transversely disposed axially alined rollers, said rollers being hollow, a fuel tank carried by the frame, a downwardly extending pipe leading from said tank, a transversely disposed pipe connected to said downwardly extending pipe, the ends of the transversely disposed pipe being connected to forwardly and inwardly extending pipes, the inwardly extending pipes being located forwardly of the rollers, and being provided with burners for projecting flame against the forward sides of the rollers and against the ground in advance of the rollers, inwardly extending pipes provided with burners extending inwardly from the forwardly extending portion of the forward and inwardly extending pipes and located within the chambers of the rollers, forwardly and outwardly extending pipes connected to the transversely disposed pipe, said forwardly and outwardly extending pipe having their outwardly extending portion provided with burners located within the adjacent ends of the chambers of the rollers and means for supplying fuel to all of the burners from a common source of supply.

In testimony whereof I have signed my name to this specification in the presence of two subscribing witnesses.

DANIEL DARLEY SMITH.

Witnesses:
JAS. B. PETERSON,
EDW. MUNN.